June 2, 1936.  W. E. CARPENTER  2,043,191
REFRIGERATING METHOD AND APPARATUS
Filed July 27, 1935   2 Sheets-Sheet 1
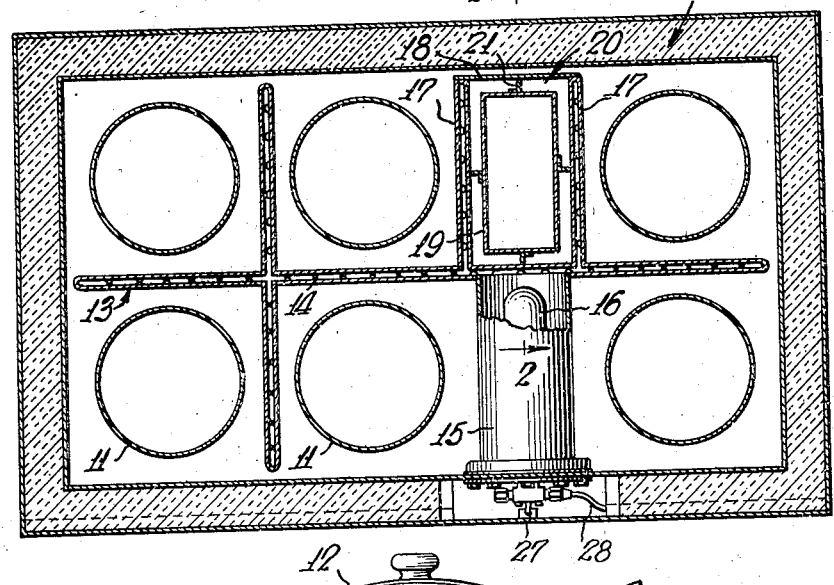
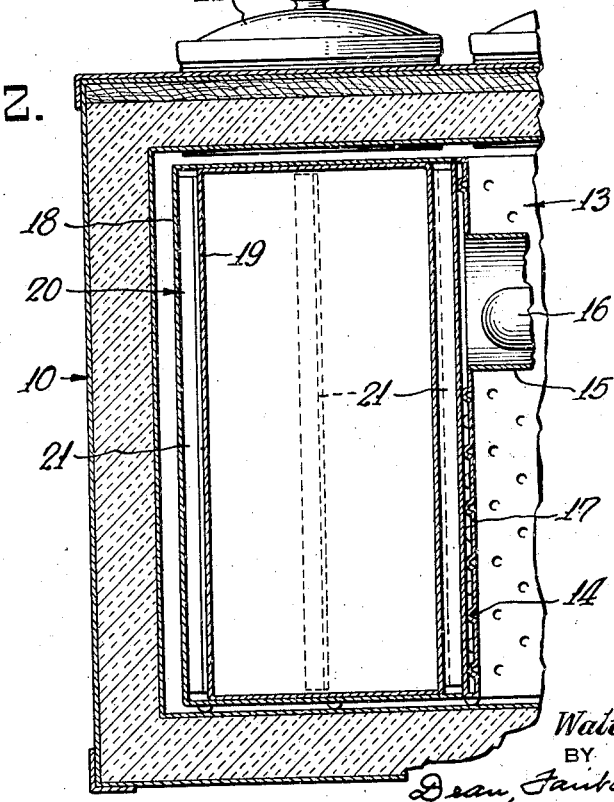
INVENTOR
Walter E. Carpenter
BY
ATTORNEYS June 2, 1936.  W. E. CARPENTER  2,043,191
REFRIGERATING METHOD AND APPARATUS
Filed July 27, 1935    2 Sheets-Sheet 2
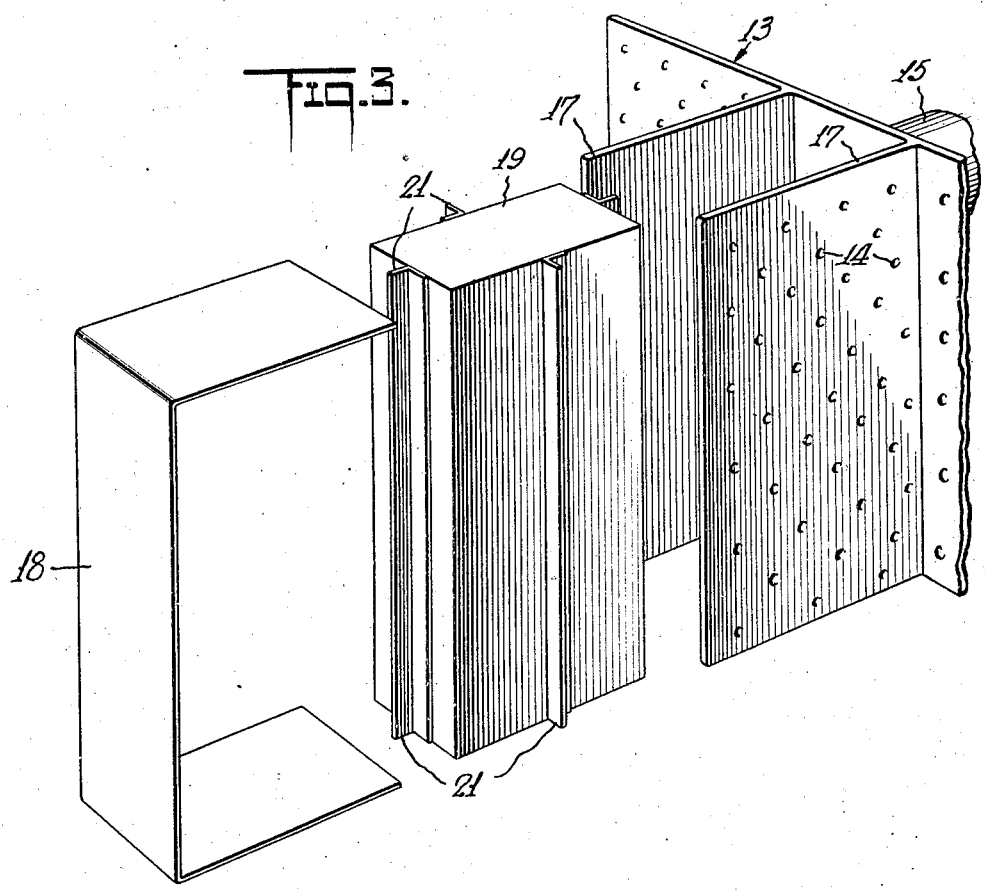
INVENTOR
Walter E. Carpenter
BY
Dean, Fairbank, Hirsch & Foster
ATTORNEYS Patented June 2, 1936

2,043,191

UNITED STATES PATENT OFFICE 2,043,191

REFRIGERATING METHOD AND APPARATUS

Walter E. Carpenter, Belmar, N. J., assignor to The Dickerson Company, Newark, N. J., a corporation of New Jersey Application July 27, 1935, Serial No. 33,490

12 Claims. (Cl. 62—95)

The use of freezable brines and cryo-hydrates and other so-called eutectic ices in refrigerated storage cabinets has found considerable favor, especially in compartments for transportation devices and dispensing cabinets for ice cream.

These freezable brines, or solutions, or cryo-hydrate compounds which for convenience of description will be hereinafter referred to as eutectic ices, are commonly employed in conjunction with the evaporators of conventional mechanical refrigerating systems. They are frozen while the refrigerating system is abstracting heat from the storage compartment and they expend their latent heat of fusion after the evaporator starts warming up thereby giving a "hold over" effect which results in less frequent operation of the compressor.

While the use of such eutectic ices has effected some economy in the cost of operating refrigerating systems and has certain other advantages, it has never heretofore been of the least assistance in solving one of the greatest problems of the ice cream manufacturer, namely, in preventing or reducing the tremendous annual loss due to spoilage of ice cream in his customers' cabinets between the time that the retailer detects softening of the cream and the time when the manufacturer can get his repair man on the job to start the refrigerating system in operation again.

It is customary in this art for the manufacturer, at his own expense, to supply the retailer with his refrigerated storage cabinets and to be responsible for the servicing of such cabinets. Therefore the spoilage of ice cream resulting from failure of refrigerating equipment from any cause, represents a direct loss to the manufacturer which in the aggregate runs into millions of dollars annually.

The very fact that a satisfactory eutectic ice melts or should melt at a constant temperature from start to finish of the meltage has prevented such ices from serving any useful purpose in warning the ice cream dealer that his refrigeration system has broken down. The dealer becomes aware of a breakdown only when the ice cream softens and such softening can only occur after complete meltage of the eutectic ice. Consequently unless a service man is immediately available to effect quick repairs, the ice cream becomes rapidly unsalable and spoils.

By my present method and apparatus this difficulty is entirely eliminated and the eutectic ice is so used that the cream will remain in a salable condition for many hours after it first shows signs of softening.

Cryo-hydrates may be compounded to melt at various temperatures and in accordance with the present invention I employ in addition to the usual freezable cryo-hydrate compound, an auxiliary or emergency tank of cryo-hydrate having a higher melting point than the main body of cryo-hydrate material and insulated from the evaporator by the main body of cryo-hydrate material.

Under all normal working conditions this auxiliary eutectic material remains frozen but upon failure of the refrigeration system and melting of the lower melting point cryo-hydrate, the auxiliary tank comes into operation and serves, not to reharden the cream, but to prevent further softening thereof after many hours. Thus the cream is kept in a salable condition even though the refrigeration system is not repaired until long (typically twenty hours) after softening of the cream begins. Thus there is always adequate time for a service man to reach the retailer's place of business and repair the faulty refrigerating system before any spoilage of the cream can occur.

While my improved system of primary and auxiliary eutectic ice might be employed with various types of evaporators, it has particular advantages when employed with an evaporator of the general character disclosed in my copending application Serial No. 9,188 filed March 4, 1935.

That application shows a flooded evaporator of the partition-forming type and as the evaporator begins to warm up, gases of course accumulate in the upper end thereof throughout the entire cross sectional area of the narrow hollow vertical partitions. By placing the low melting point cryo-hydrate solution in intimate contact with the evaporator walls and by enclosing the auxiliary higher melting point cryo-hydrate solution within the tank of lower melting point solution, the temperature throughout the evaporator may always be maintained uniform. This is because the eutectic ice is buoyant and upon melting always maintains the ice at the top of the ice tanks where it may directly transfer heat to the accumulating gases in the top of the evaporator. Gases near the eutectic ice tank condense and make room for lateral flow of uncondensed gases from the remote part of the evaporator with the result that the entire evaporator is always maintained at a substantially constant temperature during melting of the eutectic ice.

The apparatus employed involves but minor structural changes over the apparatus disclosed in my prior application above identified. The eutectic ice container occupies space which is ordinarily waste space in ice cream storage cabinets and the eutectic ice system involves no moving parts which require attention, the operation of the ice system being entirely automatic.

The apparatus herein illustrated as well as the method employed possess manifold advantages not only in the storage of ice cream but also in allied arts and these advantages will be more fully set forth in the following description in connection with one form of the typical cabinet illustrated in the drawings wherein:

Fig. 1 is a horizontal sectional view through an ice cream cabinet constructed in accordance with the invention, Fig. 2 is a vertical sectional detail on the line 2—2 of Fig. 1, Fig. 3 is an enlarged disassembled view showing the manner in which the evaporator cooperates with other elements to define the two eutectic ice tanks or compartments.

Referring to Figs. 1 to 3 of the drawings, I have illustrated an ice cream cabinet 10 having top, bottom and side walls of suitable insulating material and adapted to contain six cans 11 of ice cream, these cans being accessible through insulated hatch covers 12 in the top of the cabinet. Disposed within this cabinet and preferably spaced from the walls thereof is a partition-forming evaporator indicated generally at 13. The evaporator consists of a plurality of freely communicating hollow vertical partitions which are disposed between the cans of ice cream in the cabinet. Each partition is formed of a pair of closely spaced metallic plates indented and spot welded together as at 14 at a plurality of points to lend strength to the construction. The outer ends of the plates are likewise welded to the other plates to seal the evaporator. This evaporator construction is described in detail in my prior Patent No. 2,022,489 issued November 26, 1935 and in that application I likewise describe in detail, the construction of a boiler or reservoir 15 in the form of a tubular element welded at one end to and communicating freely with the evaporator. This horizontally disposed tubular boiler or reservoir is equipped with a float valve illustrated diagrammatically at 16 for controlling the level of refrigerant therein and its outer closed end is accessible from the exterior of the cabinet. Supply pipes 17 and 18 for the admission of liquid refrigerant and the exhaust of refrigerant gases communicate with the outer end of the boiler 15.

The boiler necessarily occupies a certain amount of space between the central longitudinal partition of the evaporator and one side wall of the cabinet and renders such space unavailable for the reception of the ice cream cans. Correspondingly there is a normal waste space between the opposite side wall of the storage cabinet and the central partition and I prefer to utilize this space for the accommodation of the eutectic ice containers so that the over-all size of a standard ice cream cabinet does not need to be increased.

Preferably a pair of hollow partitions 17 constituting part of the evaporator structure extend from the central longitudinal evaporator partition at one of the side walls of the cabinet, defining between them a space which is approximately equal to the horizontal space occupied by the boiler at the opposite side of the partition. These two partitions together with a small part of the central partition constitute part of the tank structure for what may be called the primary eutectic ice or cryo-hydrate compound. This tank is completed by a U-shaped metallic element 18 (Figs. 2 and 3) which abuts the outer ends of the partitions 17 and overlies the upper and lower edges of these partitions and is welded at all edges of the partitions to form a completely closed tank, extending the full height of the evaporator and the full length of the partitions 17. Before this tank is welded however, there is introduced into it a container 19 for the auxiliary eutectic ice. This container is smaller in horizontal dimensions than the chamber 20 cooperatively defined by the evaporator, and the member 18 and all sides of the container carry angle irons 21 for spacing the container 19 a uniform distance from the walls of the encircling tank 20.

While I of course do not wish to be limited to any dimensions insofar as the construction is concerned, or any definite melting points insofar as the eutectic ices are concerned, it may be stated that in a typical installation the outer tank 20 is approximately 6" in width, 10¾" in length and 19½" in depth and that the inner tank 19 is spaced inwardly approximately ¾ of an inch from the lateral walls of the outer tank giving it a width of 4½", a length of 9¼" and a depth of 19½". Typically the cryo-hydrate compound which is disposed in the tank 20 and which encircles the tank 19 has a melting point of minus 8° F. and the compound arranged within the tank 19 has a melting point of plus 4° F. Typically also the low melting point cryo-hydrate compound has a latent heat of fusion of approximately 1100 B. t. u. while the higher melting point within the tank 19 has a latent heat of fusion in the order of 3600 B. t. u., there being about ten pounds of the low melting point cryo-hydrate used and about thirty pounds of the high melting point cryo-hydrate used.

Under ordinary summer temperature conditions the auxiliary or higher melting point cryo-hydrate solution content in the tank 19 will maintain the ice cream in a slightly soft but perfectly salable condition for a period of fifteen to twenty hours after the lower melting point cryo-hydrate solution has been completely fused and the ice cream begins to show signs of softening.

The above figures of course are merely illustrative and typical of a commercial unit for a six can, that is a sixty gallon storage cabinet. Melting points of the eutectic ices, the amount of such ices used, etc. will of course be subject to variation in accordance with the particular refrigerating problem involved. The figures are of special interest however in indicating what may be done in an ordinary six hole cabinet where the eutectic ice containers occupy only space which is normally wasted.

In operation the compressor of the refrigerating system will start up and by the time the evaporator has been cooled down to the required extent, both tanks of eutectic ice will have been completely frozen. In normal operation when the evaporator starts to warm up again, the supply of low melting point ice will give a "hold over" effect until complete fusion of such ice has occurred whereupon the compressor will again start up and refreeze the low melting point ice. If the compressor fails to start up however, softening of the cream will become apparent to the dealer the next time he has occasion to dip cream from the cans and he will promptly notify the ice cream manufacturer that his refrigerating system has failed. Due however to the presence of a relatively large body of higher melting point eutectic ice, softening of the cream beyond the point of salability will be prevented over a long period of time and adequate time will be had for a service man to inspect the refrigerating system and repair it before the ice cream becomes unsalable or before any spoilage occurs. This is in direct contradistinction to present methods where softening of the cream is the only warning which the dealer has as to failure of the refrigerating system with the result that the complete batch of cream is usually melted within an hour or two and spoilage occurs shortly thereafter. When a breakdown of the refrigerating system occurs at night, the complete batch of cream in the cabinet is almost invariably spoiled. With my present system giving a "hold over" effect of fifteen to twenty hours, there is no excuse for any spoilage nor need there be any time at which the dealer has an unsalable product on his hands.

I am aware of the fact that it has previously been proposed to use visible or audible electric signals to indicate when a compressor has failed, but such signals are entirely unreliable because failure may frequently be caused by a blown fuse by which the signal as well as the compressor is thrown out of operation or if batteries are relied upon to actuate the signal, these batteries frequently become dead upon the shelf before they are even called upon to operate.

It will thus be seen that there is herein described a method and apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent is:—

1. A method of refrigerating comestibles of the type which afford prompt visual indication of under refrigeration, which includes normally cooling said comestibles by a standard refrigerating system of the type which circulates a volatile refrigerant through the cooler, arranging a body of eutectic ice of relatively low melting point in heat exchange relationship with the cooler to be frozen during the circulating cycle and to expend its latent heat of fusion before the next circulating cycle and disposing a eutectic ice of higher melting point in heat exchange relationship with the first mentioned ice.

2. A method of refrigerating comestibles of the type which afford prompt visual indication of under refrigeration, which includes normally cooling said comestibles by a standard refrigerating system of the type which circulates a volatile refrigerant through the cooler, arranging a body of eutectic ice of relatively low melting point in heat exchange relationship with the cooler to be frozen during the circulating cycle and to expand its latent heat of fusion before the next circulating cycle and disposing a eutectic ice of higher melting point in heat exchange relationship with the first mentioned ice and insulated from the cooler by said first mentioned ice.

3. A method of refrigerating comestibles of the type which afford prompt visual indication of under refrigeration, which includes normally cooling said comestibles by a standard refrigerating system of the type which circulates a volatile refrigerant through the cooler, arranging a body of eutectic ice of relatively low melting point in heat exchange relationship with the cooler to be frozen during the circulating cycle and to expend its latent heat of fusion before the next circulating cycle and disposing a eutectic ice of higher melting point in heat exchange relationship with the first mentioned ice and insulated from the cooler by said first mentioned ice, said higher melting point ice being present in sufficient quantity and having a sufficient latent heat of fusion to preserve the comestibles against spoilage over a prolonged period of time after such comestibles have given visual indication of under refrigeration.

4. In a refrigerating system, a primary volatile refrigerant, a secondary fusible refrigerant adapted to be intermittently frozen by the volatile refrigerant during normal operation of the system, a tertiary fusible refrigerant of higher melting point than the secondary refrigerant and insulated from the volatile refrigerant by the secondary refrigerant and normally maintained in frozen condition except at times when the volatile refrigerant fails to produce the required refrigerating effect.

5. A method of refrigerating frozen comestibles of the type normally liquid at room temperatures, which includes maintaining said comestibles in heat exchange relationship with a volatile refrigerant from which evolved gases are intermittently drawn off and reliquefied, maintaining a secondary non-volatile fusible refrigerant in heat exchange relationship with the volatile refrigerant so that said secondary refrigerant is alternately frozen by the volatile refrigerant and melted by the heat absorbed by the volatile refrigerant and maintaining a tertiary refrigerant having a higher fusing point than that of the secondary refrigerant in heat exchange relationship with the latter, whereby to prevent liquefication of the comestibles over a long period of time after failure of the volatile refrigerant has produced a noticeable softening of said comestibles.

6. Apparatus of the class described including a chamber to be refrigerated, an evaporator arranged in said chamber, a compartment for eutectic ice of relatively low melting point in heat exchange relationship with the evaporator and a compartment for eutectic ice of higher melting point insulated from the evaporator only by said first mentioned eutectic ice compartment.

7. Apparatus of the class described including a chamber to be refrigerated, an evaporator arranged in said chamber, a compartment for eutectic ice of relatively low melting point in heat exchange relationship with the evaporator and a compartment for eutectic ice of higher melting point insulated from the evaporator only by said first mentioned eutectic ice compartment and completely encircled by the ice in said first mentioned ice compartment.

8. In an ice cream storage cabinet, a partition forming evaporator, means cooperating with certain parts of said evaporator to afford a tank and eutectic ice of relatively low melting point in said tank, a second tank arranged within the first and eutectic ice of higher melting point in said second tank.

9. In an ice cream storage cabinet, a partition forming evaporator, means cooperating with certain parts of said evaporator to afford a tank and eutectic ice of relatively low melting point in said tank, a second tank arranged within the first and eutectic ice of higher melting point in said second tank, said low melting point ice normally insulating the high melting point ice from the evaporator and from the air within the cabinet.

10. In an ice cream storage cabinet, a partition forming evaporator, means cooperating with certain parts of said evaporator to afford a tank and eutectic ice of relatively low melting point in said tank, a second tank arranged within the first and eutectic ice of higher melting point in said second tank, both of said tanks extending the full height of the evaporator and both containing eutectic ice of a buoyant type.

11. A refrigerating unit for storage cabinets including a flooded partition forming evaporator unit, means associated with certain of the parts thereof for defining a tank in which relatively low melting point eutectic ice is disposed and a second tank within the first containing eutectic ice of a higher melting point.

12. A refrigerating unit for storage cabinets including a flooded partition forming evaporator unit, means associated with certain of the parts thereof for defining a tank in which relatively low melting point eutectic ice is disposed and a second tank within the first containing eutectic ice of a higher melting point, said second tank including carrying means to space it equi-distantly from the walls of the first tank.

WALTER E. CARPENTER.